United States Patent Office.

THOMAS J. MAYALL, OF READING, MASSACHUSETTS.

MANUFACTURE OF HARD RUBBER.

SPECIFICATION forming part of Letters Patent No. 247,834, dated October 4, 1881.

Application filed May 7, 1881. (No specimens.)

*To all whom it may concern:*

Be it known that I, THOMAS J. MAYALL, of Reading, in the county of Middlesex and Commonwealth of Massachusetts, have invented a new and useful Improvement in the Manufacture of "Hard Rubber," so called, of which the following is a specification.

Heretofore the substance known in the arts as "hard rubber" has been produced by mixing a portion of free sulphur with pure rubber and subjecting the compound to the action of heat at a proper temperature and for a sufficient length of time to effect what is termed "curing" or "vulcanizing."

The object of my invention is to make a hard-rubber product which will be in all respects as useful and satisfactory for the purposes for which it is to be used as the hard rubber heretofore and now made in the manner above described, and which will be much less expensive.

My invention consists in mixing and thoroughly intermingling, by grinding or otherwise, pure rubber and either of the sulphides or sulphurets of antimony, and subjecting the compound to the action of heat, without any addition of free sulphur, until it is cured to the required degree of hardness.

In the practice of my invention, the rubber is washed and purified in the usual or in any practical way, and then any of the sulphides or sulphurets of antimony is thoroughly and uniformly mixed and intermingled with it by grinding or other suitable means. This compound is then formed into such shape or shapes as may be required for its use, or run out into sheets, and subjected to the action of heat, either in molds or otherwise, in the usual or in any other suitable manner of curing rubber, of a temperature of about 250° to 350° Fahrenheit, for a period which may vary from one hour to eight or ten hours, according to the thickness of the mass to be cured, the proportions of rubber and sulphide or sulphuret of antimony used, and the required quality of the product.

A thick mass of the compound requires a longer exposure to heat to cure it to a required condition of hardness than a thin sheet. The larger the proportion of rubber in the compound the longer the time required to cure it, and the degree of hardness is determined in a great measure by the length of time the compound is heated. The curing process may be hastened to some extent by raising the temperature; but there is danger of injury to the strength and quality of the product if the temperature is carried above 350°.

To make the best quality of and strongest hard rubber by my method, I use about equal parts, by weight, of pure rubber and the sulphides or sulphurets of antimony; but for many purposes, where a coarser quality or where less strength and tenacity in the product is required, the proportion of sulphide or sulphuret of antimony may be increased to one and one-half or two, or two and one-half or three parts, by weight, to one part of rubber.

When rubber and sulphides or sulphurets of antimony are used in about equal proportions, I deem it best to subject the compound to a heat of about 300° to 325° for about four to six hours, the time to be varied from this when the mass of compound to be cured is very thin or of great thickness.

The products obtained from the compounds of rubber and sulphide or sulphurets of antimony cured as above described are entirely suitable for any and all the uses to which hard rubber as heretofore made is or may be applied; and as the sulphides or sulphurets of antimony can be produced at one-tenth the cost of rubber by the pound, it is obvious that the hard-rubber product will cost less in the proportion in which it is used in the compound.

By means of recent improvements in the art or process of reducing ores of antimony termed "stibnite" to the form of amorphous anhydrous sulphides or sulphurets, the cost of the product has been greatly reduced from what it was when produced by the ordinary method, and sulphides or sulphurets are produced of all colors and shades of colors at pleasure.

By the use of the colored sulphides I produce hard rubber of any desired color, shade, or combination of colors.

I claim as new and my invention—

1. The above-described improvement in the art of making hard rubber, consisting of mixing pure rubber and the sulphides or sulphurets of antimony, and curing the compound by heat, substantially as described.

2. As a new article of manufacture, hard rubber and hard-rubber products made by mixing rubber and the sulphides or sulphurets of antimony, and curing the compound by heating, substantially as described.

3. The production of hard rubber having any desired color, shade of color, and combination of colors by mixing with rubber colored sulphides or sulphurets of antimony and curing the compound by heating, substantially as described.

THOS. J. MAYALL.

Witnesses:
CHS. HOUGHTON,
H. KENNEY, Jr.